United States Patent
Kling et al.

(10) Patent No.: US 9,361,008 B2
(45) Date of Patent: Jun. 7, 2016

(54) RESULT-ORIENTED CONFIGURATION OF PERFORMANCE PARAMETERS

(75) Inventors: Ralph M. Kling, Sunnyvale, CA (US); Michael P. Dierks, San Francisco, CA (US)

(73) Assignee: Moog Inc., East Aurora, NY (US)

( * ) Notice: Subject to any disclaimer, the term of this patent is extended or adjusted under 35 U.S.C. 154(b) by 368 days.

(21) Appl. No.: 12/778,961

(22) Filed: May 12, 2010

(65) Prior Publication Data
US 2011/0283235 A1  Nov. 17, 2011

(51) Int. Cl.
*G06F 3/048* (2013.01)
*G06F 3/0484* (2013.01)
*G06F 1/32* (2006.01)

(52) U.S. Cl.
CPC .......... *G06F 3/04847* (2013.01); *G06F 1/3234* (2013.01)

(58) Field of Classification Search
CPC ............. G06F 1/3234; G06F 3/04847; H04W 52/0254; H04W 52/0258; H04W 52/0251
USPC ................ 715/832, 833; 340/539.13, 539.17; 455/456.1
See application file for complete search history.

(56) References Cited

U.S. PATENT DOCUMENTS

| | | | |
|---|---|---|---|
| 5,825,651 A * | 10/1998 | Gupta et al. | 700/103 |
| 6,850,254 B1 * | 2/2005 | Banning et al. | 715/784 |
| 7,266,489 B2 * | 9/2007 | Hunt et al. | 703/14 |
| 7,376,469 B2 * | 5/2008 | Eischeid et al. | 700/17 |
| 7,562,310 B2 * | 7/2009 | Champion et al. | 715/833 |
| 7,706,844 B2 * | 4/2010 | Ranta | 455/574 |
| 7,835,770 B2 * | 11/2010 | Cadene | 455/566 |
| 7,873,917 B2 * | 1/2011 | Larsen et al. | 715/833 |
| 8,130,096 B2 * | 3/2012 | Monte et al. | 340/539.13 |
| 8,254,868 B2 * | 8/2012 | Constien et al. | 455/343.1 |
| 2001/0035884 A1 * | 11/2001 | Kikinis et al. | 345/833 |
| 2002/0036657 A1 * | 3/2002 | Grieve et al. | 345/764 |
| 2003/0125776 A1 * | 7/2003 | Turney et al. | 607/27 |
| 2003/0231213 A1 * | 12/2003 | Gould et al. | 345/782 |
| 2006/0053129 A1 * | 3/2006 | Motwani et al. | 707/101 |
| 2007/0113183 A1 * | 5/2007 | Brinkmann et al. | 715/723 |

(Continued)

FOREIGN PATENT DOCUMENTS

DE     0745916 A1 * 12/1996 ............. G05B 13/02

OTHER PUBLICATIONS

McFedries; Paul, Windows 7 Visual Quick Tips, Visual, ISBN: 978-0-470-52117-5, Oct. 5, 2009, pp. 268-269.*

(Continued)

*Primary Examiner* — Doon Chow
*Assistant Examiner* — Wilson Varga
(74) *Attorney, Agent, or Firm* — Hodgson Russ LLP (57) ABSTRACT

A plurality of configuration parameters for setting a device are determined by setting one or more performance parameters. The performance parameters are end-results of configuration that a user desires to achieve by setting the configuration parameters on a device. By setting the performance parameters instead of multiple configuration parameters, the user can conveniently achieve desired performance on the device without having to try many combinations of configuration parameters. When the user sets a performance parameter value, a set of configuration parameters corresponding to the performance value is computed or retrieved. The performance parameters may be set using a user interface element such as a slider that is intuitive and easy to manipulate.

16 Claims, 8 Drawing Sheets

(56) References Cited

U.S. PATENT DOCUMENTS

| | | | |
|---|---|---|---|
| 2007/0185631 A1* | 8/2007 | Yeh et al. | 701/36 |
| 2008/0005090 A1* | 1/2008 | Khan et al. | 707/4 |
| 2008/0122796 A1* | 5/2008 | Jobs et al. | 345/173 |
| 2008/0242511 A1* | 10/2008 | Munoz et al. | 482/5 |
| 2008/0256489 A1* | 10/2008 | Maurer et al. | 715/833 |
| 2009/0132091 A1* | 5/2009 | Chambers et al. | 700/276 |
| 2009/0143916 A1* | 6/2009 | Boll et al. | 700/276 |
| 2010/0042826 A1* | 2/2010 | Bull et al. | 713/100 |
| 2010/0083116 A1* | 4/2010 | Akifusa et al. | 715/727 |
| 2010/0152927 A1* | 6/2010 | Sacle et al. | 701/3 |
| 2010/0312364 A1* | 12/2010 | Eryilmaz et al. | 700/30 |
| 2011/0252028 A1* | 10/2011 | Jensen | 707/728 |
| 2013/0325083 A1* | 12/2013 | Bharmi et al. | 607/46 |

OTHER PUBLICATIONS

"continuous model", "discrete model", "key", "union" definitions: IEEE 100, The Authoritative Dictionary of IEEE Standards Terms, 7th edition, copyright 2000 by The Institute of Electrical and Electronics Engineers. ISBN 0-7381-2601-2. pp. 227-229, 322, 600-601, 1234.*

Sedgewick, Robert; Alorithms, 1998, Addison Wesley, 2nd edition, ISBN 0-201-06673-4, pp. 193-195.*

Johnsonbaugh, Richard; Discrete Mathematics, 1984, Macmillan, ISBN 0-02-359690-2, pp. 59-62.*

* cited by examiner

RESULT-ORIENTED CONFIGURATION OF PERFORMANCE PARAMETERS

FIELD OF THE INVENTION

This invention relates to configuring performance parameters of a device, more specifically to configuring performance parameters using a graphical user interface.

BACKGROUND OF THE INVENTION

Some devices may be manually configured to adapt to various factors such as the context or environment in which the devices operate. Such devices may require setting of one or more configuration parameters to achieve a desired performance level that may be represented by one or more performance parameters. The applicable performance parameters may depend on various factors such as the type of device, hardware components of the device, and software components of the device. Example performance parameters include, for example, operating time, power consumption, processing speed, and transmission distance of signals. Taking an example of an asset tracking device that tracks and reports location and/or status of a moving asset, a user may choose configuration parameters such as the reporting interval, and the strength of wireless signals generated by the asset tracking device. By changing such optional configuration parameters, a user may achieve the desired performance parameter within the constraints posed by various aspects of device operation.

Figure 1:
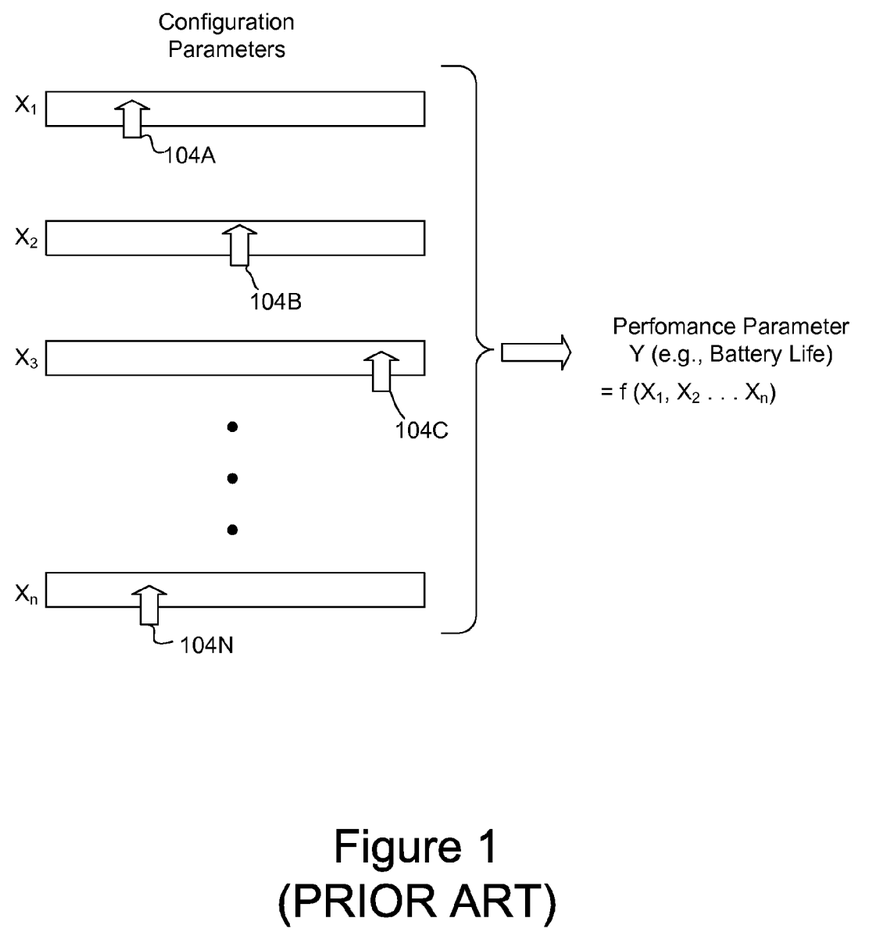
FIG. 1 is a conceptual diagram illustrating a conventional method of setting multiple configuration parameters by operating a user interface.

FIG. 1 is a conceptual diagram illustrating a conventional method of setting a performance parameter Y by setting configuration parameters $X_1$ through $X_n$. In this example, the performance parameter is an estimated battery life. The configuration parameters $X_1$ through $X_n$ include various configurable parameters that affect the battery life. For example, the configurable parameters include the interval of data transmission, processing speed of a processor, and backlight intensity of a display device. In a conventional system, a user sets values for each of the configuration parameters $X_1$ through $X_n$. In response, a performance parameter value Y corresponding to the set of configuration parameters $X_1$ through $X_n$ may be displayed for approval by the user before applying the configuration parameters $X_1$ through $X_n$ to the device. In other words, the user provides a set of configuration parameters $(X_1, X_2, \ldots X_n)$, and the value of the performance parameter Y is determined as a function (f) of the configuration parameters $(X_1, X_2, \ldots, X_n)$.

Achieving the desired performance parameter Y through setting of the configuration parameters $X_1$ through $X_n$ may pose issues under certain circumstances. If the relationship (function "f") between the optional configuration parameters $X_1$ through $X_N$ and the performance parameter Y is not intuitive, a user may have to test many combinations of configuration parameter values $X_1$ through $X_n$ before the user can find a correct set of configuration parameters $X_1$ through $X_n$ for attaining a certain performance parameter. The process of finding the configuration parameter values $X_1$ through $X_n$ may involve a trial and error which may take an extended amount of time.

Moreover, more often than not, the combination of configuration parameters achieved by trial and error may not be optimal in one way or the other. The issue is exacerbated if there are a large number of configuration values to be set, the configuration parameters values are interdependent on each other and/or the user is unfamiliar with the details of the device operation. In such case, the user may have to spend an extended amount of time to find a correct combination of configuration parameters.

SUMMARY OF THE INVENTION

Embodiments relate to configuring a device by a user interface that allows a user to conveniently and intuitively set one or more performance parameters that a user desires to achieve in the device. A user interface for setting the one or more performance parameters is presented to the user. The user may provide input via an input module to set the one or more performance parameters in the user interface. In response, a plurality of configuration parameters corresponding to the received performance parameters are automatically determined. The configuration parameters are associated with characteristics of the device that can be configured. The device may then be set according to the determined configuration.

In one embodiment, the user interface includes one or more graphical user elements. The graphical user element may include a path extending between two end points. The indicator may move along the path between the two end points to set the performance parameter. The lower end point of the path corresponds to a lower extreme of a value range of the performance parameter, and the upper end point of the path corresponds to an upper extreme of the value range of the performance parameter.

In one embodiment, the device is an asset tracking device that includes at least one sensor for detecting location or state of an asset associated with the asset tracking device.

In one embodiment, a set of configuration parameters corresponding to the performance parameter are identified from a set of configuration parameters from a mapper table.

In one embodiment, the mapper table is generated by (i) defining sets of configuration parameters of the device, (ii) computing a performance parameter value for each set of configuration parameters, (iii) selectively discarding one or more sets of configuration parameters having overlapping performance parameter values, and (iv) storing remaining performance parameters and associated sets of configuration parameters.

DETAILED DESCRIPTION OF INVENTION

Embodiments of the invention relate to setting a plurality of configuration parameters by one or more performance parameters. The performance parameters are end-results of configuration that a user desires to achieve by setting the configuration parameters on a device. By setting the performance parameters instead of multiple configuration parameters, the user can conveniently achieve the desired performance on the device without having to try many combinations of configuration parameters. When the user sets a performance parameter value, a set of configuration parameters corresponding to the performance value is computed or retrieved. The device may be set according to the computed or retrieved configuration parameters to achieve a performance level that the user desires.

A performance parameter herein refers to a parameter representing operating characteristics of a device that is of interest to a user. Applicable performance parameter may differ depending on various factors such as the type of device, the operating system of the device, and the hardware components installed on the device. The performance parameter may include, among others, the battery life of a device, used memory space, responsiveness of the device, extent of sensor signal processing and accuracy of location determination. In one embodiment, the hardware components or the software components (e.g., operating system) do not allow direct setting of the performance parameter.

A configuration parameter herein refers to a parameter that is configurable to modify the performance parameter of the device. The configuration parameter also differs depending upon various factors such as the performance parameter at issue, hardware configuration of a device, the operating system of the device, and the type of device. Taking an example where the battery life of a device is a performance parameter, the configuration parameter may include, among others, the frequency of message transmittal, the processing speed of a processor, the light intensity of a display device, the strength of transmission signal, enabling/disabling of functions, operating mode of the device (e.g., hibernation mode or normal operating mode), and configuration of global positioning system receivers (e.g., operating mode emphasizing sensitivity of the receiver or power consumption). In one embodiment, hardware components or software components (e.g., operating system) of the device allow setting of performance parameters via setting of the configuration parameters.

The number of configuration parameters is at least one more than the number of performance parameters. In one embodiment, the number of performance parameter is one and the number of configuration parameters is more than two. In another embodiment, the number of performance parameter is two and the number of configuration parameters is more than three. In one or more embodiments, the number of configuration parameters may be much larger than the number of performance parameters. For example, the number of configuration parameters may be ten to hundred times time the number of performance parameters.

Overview of Configuration Paradigm

Figure 2A:
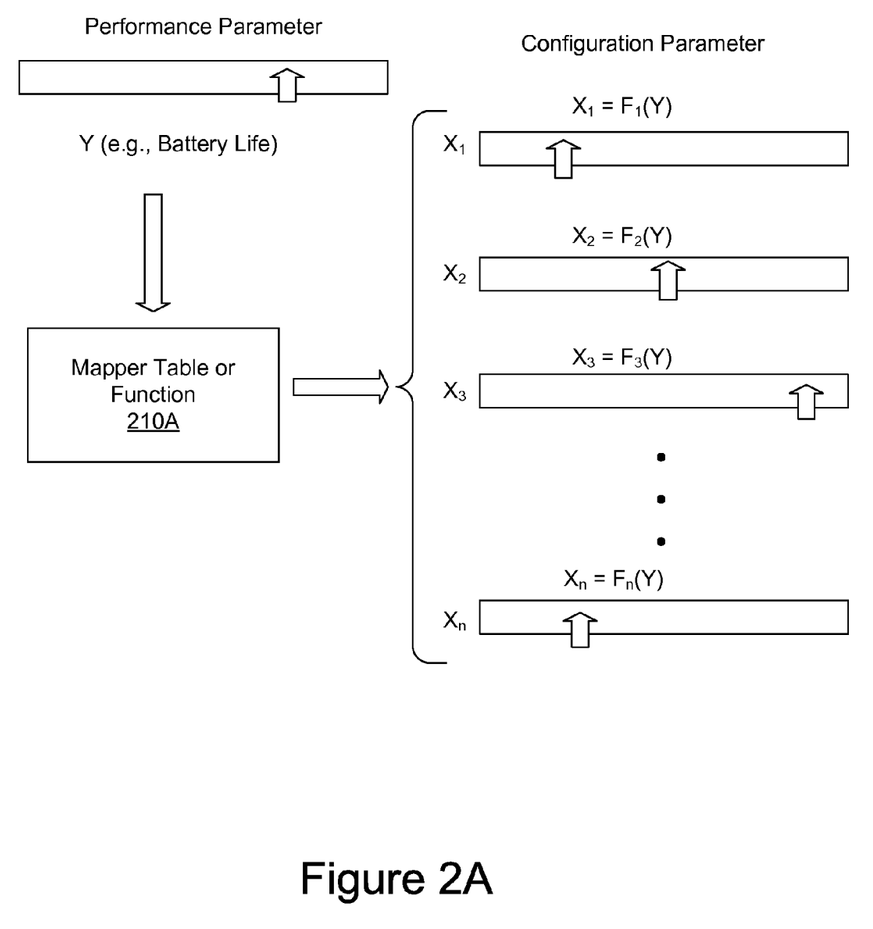
FIG. 2A is a conceptual diagram illustrating setting of a single performance parameter and determining corresponding configuration parameters, according to one embodiment of the present invention.

FIG. 2A is a conceptual diagram illustrating setting of a single performance parameter and determining corresponding configuration parameters, according to one embodiment of the present invention. A user provides performance parameter Y indicating the performance that the user desires to achieve in a device at issue. The performance parameter Y, for example, may be provided via an input module installed on the device or through another device that communicates with the device (e.g., via a cable connection or wireless connection). In response to receiving the performance parameter Y, corresponding sets of configuration parameters $X_1$ through $X_n$ are automatically identified by referencing a mapper table or function.

Compare embodiment of FIG. 2A with the example of FIG. 1. In the configuration system of FIG. 1, a user needs to identify a set of configuration parameters $X_1$ through $X_n$ by a trial and error method, hoping to achieve the performance parameter Y that the user desires. Conversely, in the configuration system of FIG. 2A, a user specifically identifies the performance parameter Y that the user needs to achieve. After the performance parameter is set, the underlying configuration parameters $X_1$ through $X_n$ are determined automatically by mapper table or function 210A, obviating the need for the user to test and set a large number of configuration parameters. In other words, in the configuration of FIG. 2A, the mapper table or function 210A serves as functions $F_1(Y)$ through $F_n(Y)$ for determining values of configuration parameters $X_1$ through $X_n$ corresponding to a value of the performance parameter Y.

Figure 2B:
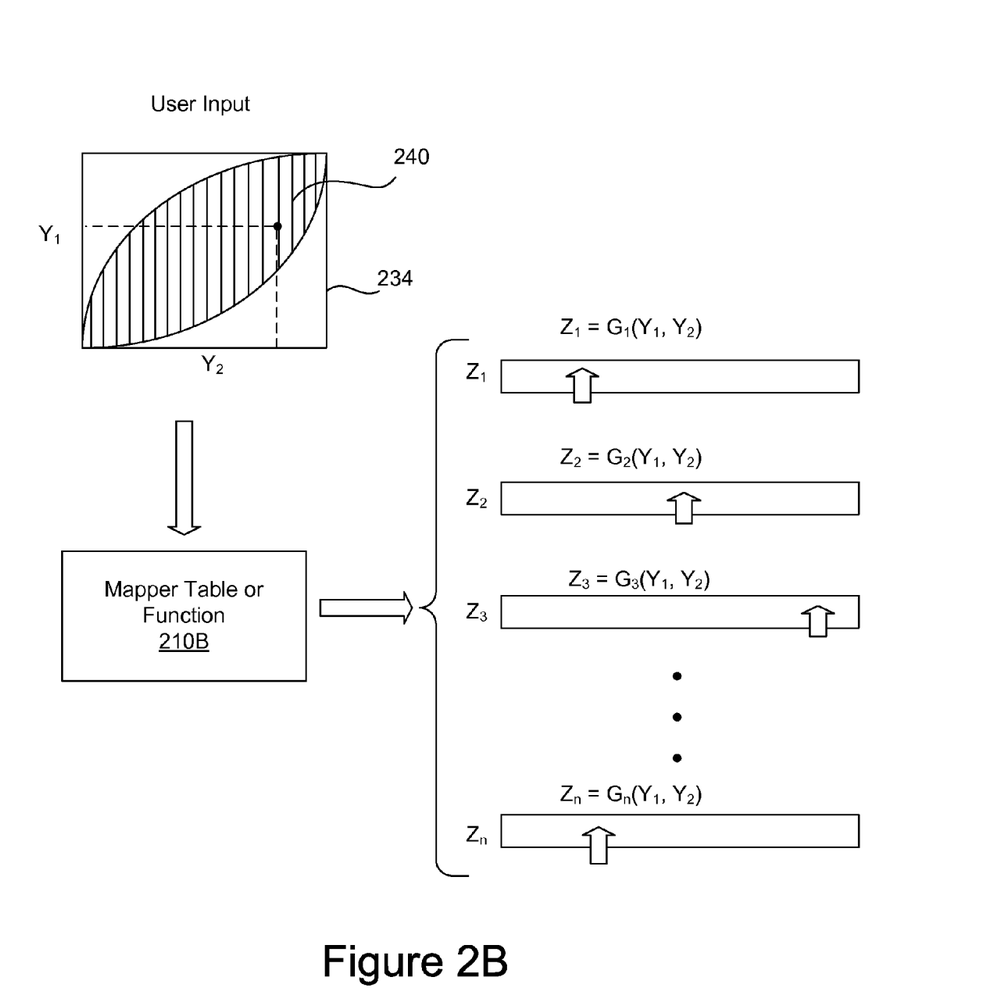
FIG. 2B is a conceptual diagram illustrating setting of two performance parameters and determining corresponding configuration parameters, according to one embodiment of the present invention.

More than one performance parameters may also be set by a user. FIG. 2B is a conceptual diagram illustrating setting of two performance parameters $Y_1$, $Y_2$ and determining corresponding configuration parameters $Z_1$ through $Z_n$, according to one embodiment of the present invention. In the example of FIG. 2B, the performance parameters $Y_1$ and $Y_2$ are related. That is, for different $Y_1$ values, the permissible range of $Y_2$ values differs, and vice versa. As a result, within entire configuration space represented by box 234, a subset of configuration space represented by hashed area 240 can be taken by $Y_1$ and $Y_2$.

After a user provides the combination of $Y_1$ and $Y_2$ values, a set of corresponding configuration parameters $Z_1$ through $Z_n$ is automatically identified by the mapper table or function 210B. As a result, the user only needs to provide two performance parameters $Y_1$ and $Y_2$, and thereby set a plurality of configuration parameters $Z_1$ through $Z_n$. In other words, in the configuration of FIG. 2B, the mapper table or function 210B serves as functions $G_1(Y_1, Y_2)$ through $G_n(Y_1, Y_2)$ for determining values of configuration parameters $Z_1$ through $Z_n$ corresponding to the values of performance parameters $Y_1$ and $Y_2$.

The performance parameters in FIGS. 2A and 2B have discrete values (e.g., ON or OFF). Although in most practical applications the number of performance parameters would be fewer than the number of configuration parameters, the number of performance parameters may be the same as or more than the number of configuration parameters.

Architecture of Asset Tracking Device

Figure 3:
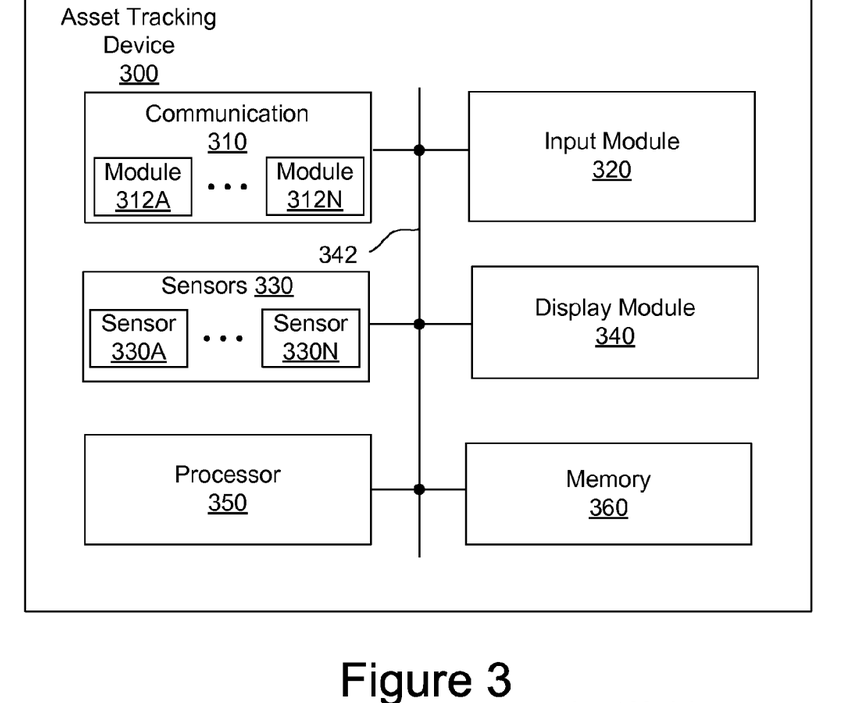
FIG. 3 is a block diagram illustrating an asset tracking device, according to one embodiment of the present invention.

In one embodiment, the configuration paradigm as described above with reference to FIGS. 2A and 2B is applied to an asset tracking device 300. The asset tracking device 300 is a wireless communication device that can identify the current location and/or states of an asset (e.g., a cargo or vehicle). The asset tracking device 300 collects information about the asset, and sends the information to a remote device for analysis and presentation to a user. The asset tracking device 300 may include, among other components, a communication module 310, an input module 320, one or more sensors 330A through 330N (collectively referred to as sensors 330), a display module 340, a processor 350, a memory 360 and a bus 342 connecting these components.

The communication module 310 is hardware, software, firmware or a combination thereof for wirelessly communicating with the remote device. The communication module 310 may employ various wireless communication protocols such as Wi-Fi, Bluetooth, and cellular communications protocols to communicate with the remote device. The communication module 310 may also use wired communication protocols to communicate with the remote device.

In one embodiment, the communication module 310 includes two or more communication modules 312A through 312N. Each communication module may use different communication protocols, communication modes or mechanism to communicate with the remote device. At least one configuration parameter may be associated with choosing one of the modules 312A through 312N for communication with the remote device. That is, when a user sets the performance parameter, one or more configuration parameters be determined which activates one of the modules 312A through 312N.

The remote device may be a computing device having communication capability to collect information from one or more asset tracking devices. The remote device may be a user device used by a user to control, maintain and operate the asset tracking device 300.

The input module 320 is hardware, software, firmware or a combination thereof for receiving various user inputs, including the performance parameters associated with the operation of the asset tracking device 300. The input module 320 may be embodied, for example, as a set of keypads, touchscreen or a tracking device (e.g., mouse).

The processor 350 is hardware for executing instructions stored in memory 360. Based on the instructions stored in memory 360, the processor 350 processes data and controls other components of the asset tracking device 300 via the bus 342.

The sensors 330 are hardware, software, firmware or combinations thereof for sensing location and/or other states of a tracked asset. The asset tracking device 300 may, for example, detect location using a global positioning system (GPS) or other types of satellite positioning systems or employ other wireless localizing schemes (e.g., sensor for detecting time-of-first arrival of a signal from a known location or sensor associated with determining received signal strength indicator (RSSI) of a wireless signal received from a known location) and generate location information representing the location of the tracked asset.

The asset tracking device 300 may also detect other states of the tracked asset. The sensors 330 for detecting other states may include, for example, a temperature sensor, a noise sensor, a pressure sensor, a tilt sensor, a tamper switch, a camera sensor, an infrared sensor, a humidity sensor, magnetometer, bolometer, X-ray sensor or other types of electrical, mechanical or electromechanical or MEMS (microelectromechanical systems) devices. These sensors may provide raw information or pre-processed signals. Processed signals provided by the asset tracking device 300 may include, for example, an alert indicating that the tracked asset has deviated from a geographic boundary (e.g., a geo-fence), status of temperature alert, cumulative information (e.g., temperature threshold exceeded over a predetermined amount of time), computed information (e.g., shock alert interpreted from accelerometer), proxy information (e.g., fusion of temperature and pressure to determine take off or landing of an aircraft) and other derived signals. Sensor signals from the sensors 330 may be received by the processor 350, converted to a data unit, and transmitted to the remote device via the communication module 310. It is also possible to transmit raw data and have the processing performed on a remote device.

In one embodiment, one or more configuration parameters may be associated with enabling or disabling a subset of sensors 330, controlling the performance of the sensors 330 and the degree of processing associated with pre-processing of the sensor signals at the sensors 330.

The display module 340 is hardware, software, firmware or a combination thereof for presenting visual information to a user. The display module 340 may include, for example, a graphics processing unit (GPU), hardware interface to a display device, and a display device (e.g., touchscreen). Example graphical user screens displayed on the display device are described below in detail with reference to FIGS. 7A through 7C.

The memory 360 stores various information and instructions associated with the operation of the asset tracking device 300. Example software components in the memory 360 are described below in detail with reference to FIG. 4.

In an alternative embodiment, the input module 320 and/or the display module 340 is replaced or supplanted with an interface module for communicating with a separate user device (e.g., a computing device). The interface module is, for example, a Universal Serial Bus (USB) interface for connecting to the user device. Instead of receiving user input directly from the input module 320, the user input is received at the user device and sent to the asset tracking device 300. Similarly, visual information for presenting to the user may be sent from the asset tracking device 300 to the user device and displayed on a display device of the user device.

The asset tracking device 300 of FIG. 3 is merely illustrative. The asset tracking device 300 may have different configurations and include additional components or omit some components illustrated in FIG. 3. In one embodiment, the asset tracking device 300 is embodied as a single unitary device that can be affixed or secured to an asset. In one embodiment, the asset tracking device 300 is an integrated device operating on battery.

Figure 4:
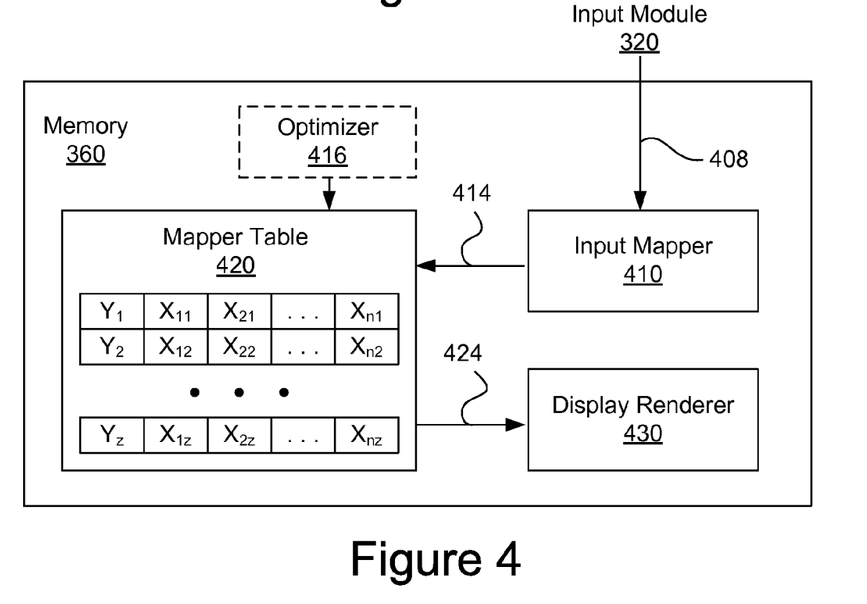
FIG. 4 is a block diagram of software components stored in memory of the asset tracking device, according to one embodiment of the present invention.

FIG. 4 is a block diagram of software components stored in the memory 360, according to one embodiment of the present invention. The memory 360 may include, among other components, an input mapper 410, a mapper table 420 and a display renderer 430. The memory 360 may also include optimizer 416 performing an optimization process, as described below in detail with reference to FIG. 5. One or more of these software components may be stored and executed on the user device separate from the asset tracking device 300.

The input mapper 410 receives input 408 from the user via the input module 320 and identifies a performance parameter value 414 corresponding to the input. For example, the input from the user may indicate "long," "medium" or "short" battery life. The input mapper 410 determines the performance parameter value 414 corresponding to such input and sends the identified performance parameter value 414 to the mapper table 420.

The mapper table 420 stores relationships between performance parameter values $Y_1$ through $Y_Z$ and configuration parameter values $X_{11}$ through $X_{nz}$. After receiving the performance parameter 414 from the input mapper 410, the mapper table 420 identifies a corresponding set of configuration parameter values 424 and sends the identified configuration parameter values 424 to the display renderer 430. If one performance parameter can take 'z' number of values, which may be mapped to 'n' number of configuration parameters, the mapper table 420 would include a (n×z) matrix table.

In another embodiment, the mapper table 420 may include 'n' number of mathematical functions that map the configuration parameter values 414 to the set of configuration parameter values 424. The functions may be generated by fitting the entries in the mapper table 420.

If two performance parameters (e.g., $Y_1$ and $Y_2$ as described above with reference to FIG. 2B) are set by the user, a three dimensional matrix table of (m×n×z) size may be needed where the 'm' represents the number of values that can be taken by the first performance parameter, 'n' represents the number of values that can be taken by the second performance parameter, and 'z' represents the number of configuration parameters associated with the first and second performance parameters.

The display renderer 430 renders a graphical user interface to present information about the operation of the asset tracking device 300 according to the current setting of the performance parameter 414. The information presented to the user may include the configuration parameter values corresponding to the current performance parameter value. In one embodiment, the display renderer 430 is part of an operating system (e.g., Microsoft Windows or Mac OS X) that generates windows and/or other user interface elements on a display device.

The optimizer 416 analyzes the relationships between the performance parameters and the configuration parameters to generate the mapper table 420, as described below in detail with reference to FIG. 5. Although the optimizer 416 is described as being stored in the memory 360 of the asset tracking device 300, in most practical applications, the optimizer 416 will be installed and operated on a computing device separate from the asset tracking device 300. After the mapper table 420 is generated on the computing device, the mapper table 420 can be copied onto the asset tracking device 300 or a user device for communicating with and configuring the asset tracking device 300.

Generating Mapper Table

Figure 5:
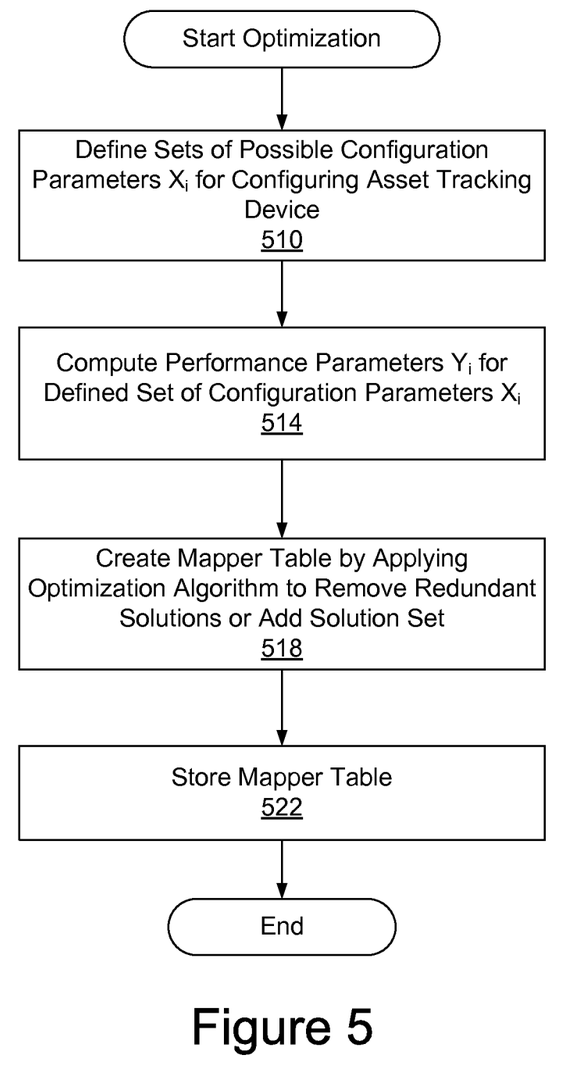
FIG. 5 is a flowchart illustrating a method of generating a mapper table, according to one embodiment of the present invention.

FIG. 5 is a flowchart illustrating a method of generating the mapper table 420 by the optimizer 416, according to one embodiment of the present invention. The method may be performed on the asset tracking device 300, a user device, or a computing device separate from the asset tracking device 300 and the user device. After the mapper table 420 is generated, the mapper table 420 may be copied and stored in any device for configuring the asset tracking devices.

In one embodiment, a set of possible configuration parameter values $X_i$ for configuring the asset tracking device is defined 510. In defining the configuration parameters, combinations of configuration parameters that may cause conflicts or malfunction in the asset tracking device may be discarded. Also, a range of configuration parameter values not preferred for one reason or the other may be discarded. An exhaustive search, Monte Carlo simulation or other similar algorithms may be used to identify all sets of configuration parameter values $X_i$.

Based on the defined combination of configuration parameter values $X_i$, performance parameter values $Y_i$ corresponding to the combination are computed 514. In one embodiment, a subset of all possible configuration parameter values $X_i$ is selected for processing. In one embodiment, the configuration parameter values and the performance parameter values corresponding to the configuration parameters are stored for further processing. The performance values $Y_i$ may be computed using simulation or by experimental trials of the asset tracking device 300 based on various configuration parameters $X_i$.

For certain performance parameter values, there may be more than one set of corresponding configuration parameter values. An optimization algorithm may be executed to select one set of configuration parameters that are likely to result in optimized performance of the asset tracking device 300. For some performance parameter values, there may be no corresponding configuration parameter either due to (i) incomplete definition of the configuration parameters $X_i$ or (ii) technical infeasibility to obtain performance parameter values. If the lack of the corresponding parameter is due to incomplete definition of the configuration parameters $X_i$, interpolation, extrapolation or further search for the corresponding configuration parameters may be performed.

The mapper 420 table is then created 518 based on the selected sets of configuration parameters and/or added sets of configuration parameters. The created mapper table 420 is then stored 522 in the asset tracking device, the user device or other devices.

The performance parameters have discrete values (e.g., any discrete value from 1 to 100, on or off, or "High", "Medium", and "Low"). The configuration parameters may have continuous or discrete values. Further, the performance parameter and/or the configuration parameter combination may be sparse.

The method of generating the mapper table 420 of FIG. 5 is merely illustrative. Various other methods may be used to generate the mapper table 420. For example, random sets of configuration parameters may be selected and then corresponding performance parameters $Y_i$ may be computed for only the selected sets of configuration parameters $X_i$. Further, the mapper table 420 may be fit to create one or more functions using methods well known in the art. The created functions can then be used to identify sets of configuration parameter values corresponding to a performance parameter value.

Determining Configuration Parameters Based on Performance Parameters

Figure 6:
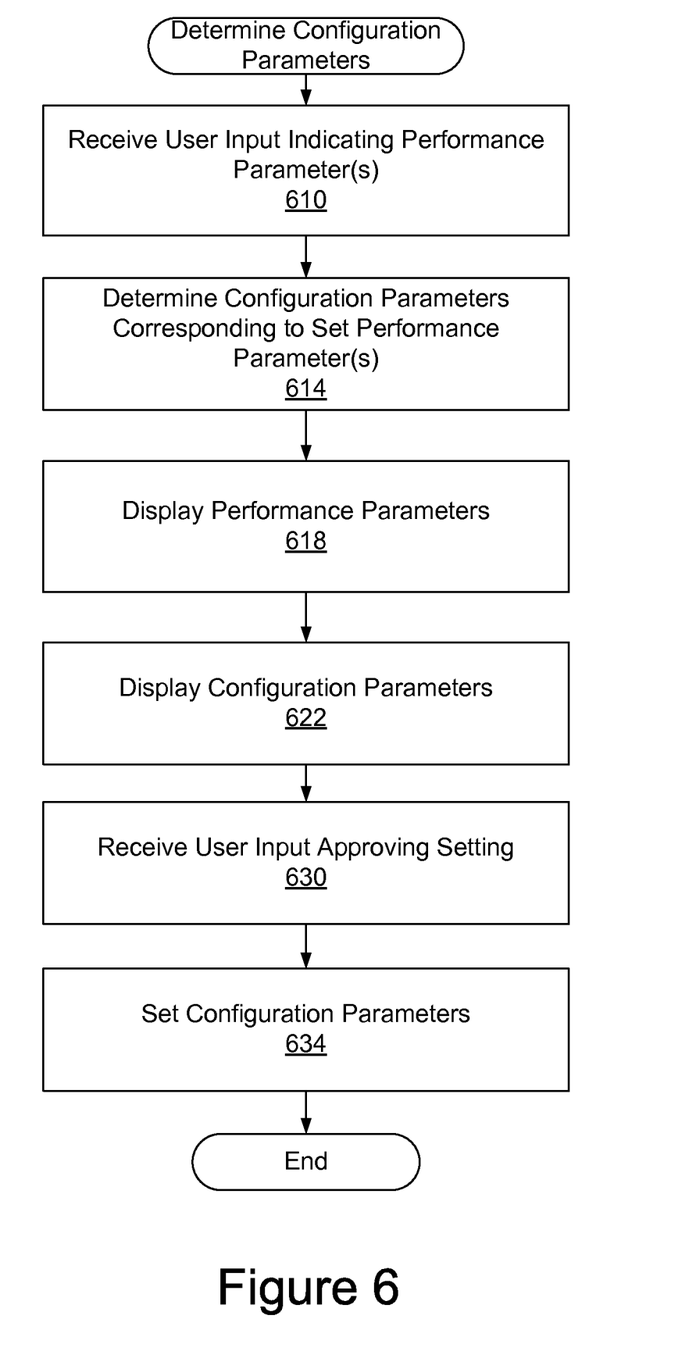
FIG. 6 is a flowchart illustrating a method of determining configuration parameters corresponding to one or more performance parameters, according to one embodiment of the present invention.

FIG. 6 is a flowchart illustrating a method of determining configuration parameters corresponding to one or more performance parameters, according to one embodiment of the present invention. The method of FIG. 6 may be performed on any device for configuring the asset tracking device 300. The configuring device may be the asset tracking device 300 or a user device that communicates with the asset tracking device 300.

User input indicating one or more performance parameters are received 610 via the input module in the user device or the asset tracking device. Various types of graphical user interface elements may be employed to receive the performance parameters. Examples of the graphical user interface elements are described below in detail with reference to FIGS. 7A through 7C.

By referencing the mapper table 420 or mapping functions, a set of configuration parameters corresponding to the received performance parameters is determined 614.

In one embodiment, the performance parameters received from the user is displayed 618 to the user. The configuration parameters corresponding to the performance parameters may also be displayed 622 to the user.

Then user input indicating approval of the setting is received 630. In response, the configurations parameters corresponding to the received performance parameter are set 634 in the asset tracking device 300.

The sequence and steps in FIG. 6 are merely illustrative. Various other sequences and steps may be employed. For example, displaying 618 of the performance parameters and displaying 622 of configuration parameters may be performed in a reverse sequence or in parallel. Further, the step of receiving 630 user approval may be omitted.

Example Graphical User Interface

The performance parameter may be set using a graphical user interface including an indicator and a path associated with the indicator. A user may move the indicator along the path to set the performance parameter, and affect changes in the configuration parameters associated with the performance parameter. The user interface may also include elements showing changes of the performance parameter and/or the configuration parameters according to the setting to assist the user's setting of the parameters.

Figure 7A:
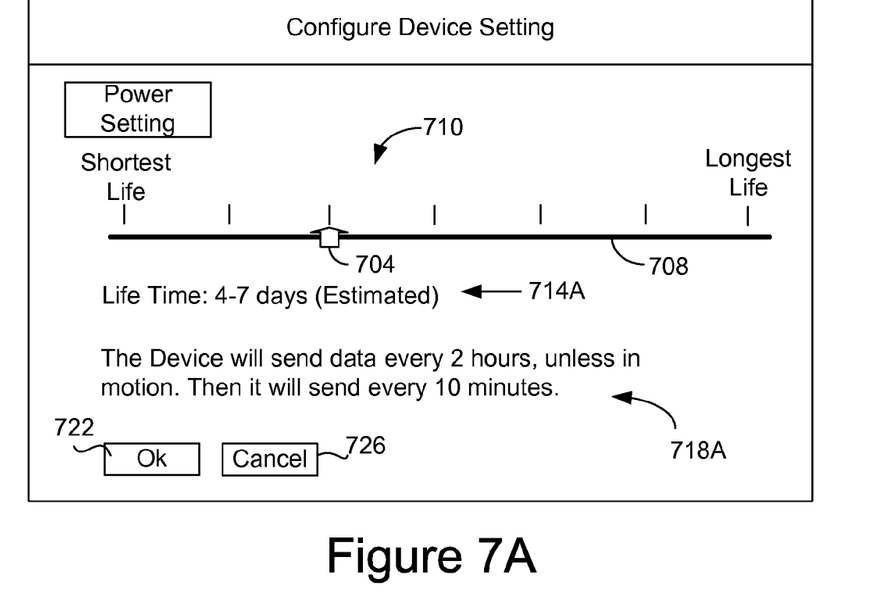
FIG. 7A is a user interface screen illustrating a slider control for setting a performance parameter, according to one embodiment of the present invention.

FIG. 7A is a user interface screen illustrating slider control 710 for setting a performance parameter, according to one embodiment of the present invention. The slider control 710 includes an indicator 704 and a linear path 708. The slider 704 serves as an indicator that shows the current setting relative to the permissible range of settings. The slider 704 moves along the path 708 between the left end (shortest battery life) and the right end (longest battery life). The example of FIG. 7A includes a single performance parameter: life of the battery. The performance parameter in the current setting is displayed in message 714A as '4-7 days.'

The asset tracking device in this example is concerned primarily associated with tracking the location of an asset. Message 718A indicates the two configuration parameters associated with the performance parameter: (i) the frequency (e.g., 2 hours) of data transmission when the asset tracking device 300 is stationary and (ii) the frequency (e.g., 10 minutes) of data transmission when the asset tracking device 300 is moving.

The slider control 710 is more convenient to operate compared to a drop-down menu because a user can easily perceive the setting of the performance parameter relative to the entire range of a parameter value. That is, the slider control 710 gives a visual cue to the user as to how a performance parameter setting is higher or lower than other available settings. The slider control 710 also allows the user to conveniently observe changes in the configuration parameters as the performance parameter changes, and provides the user with the appearance of continuity even when the underlying configuration parameters are sparse or discontinuous.

If the user determines that the performance parameters and/or the configuration parameters are acceptable, the user may clicks "Ok" button 722 to apply the setting to the asset tracking device 300. Conversely, if the user decides not to change the previous setting or use a default setting, the user may click "Cancel" button 726 and exit the configuration window.

Figure 7B:
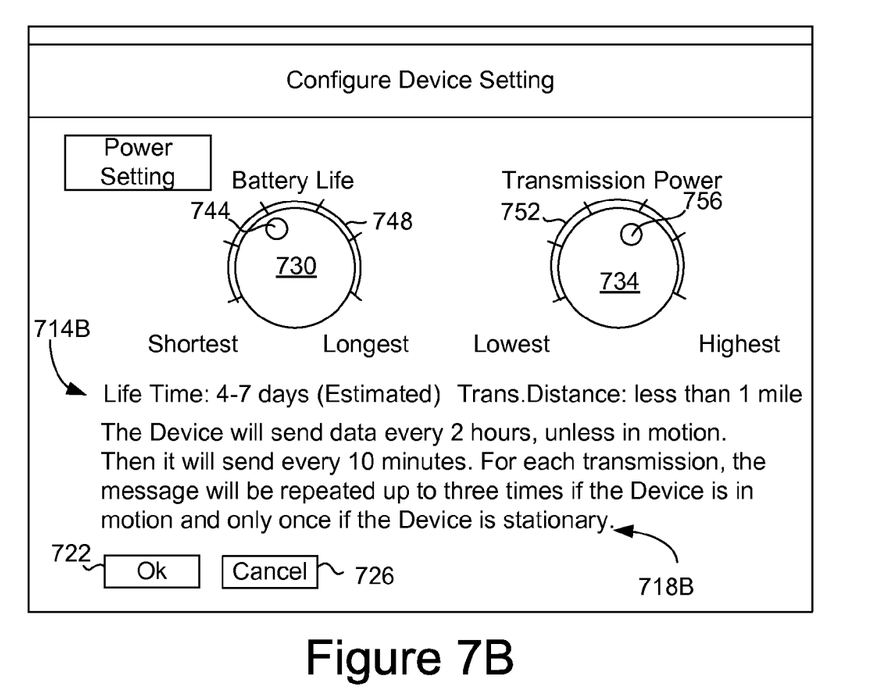
FIG. 7B is a user interface screen illustrating rotating dial controls for setting performance parameters, according to one embodiment of the present invention.

FIG. 7B is a user interface screen illustrating rotating dial controls 730, 734 for setting two performance parameters, according to one embodiment of the present invention. The two performance parameters relevant in the example of FIG. 7B are battery life and the transmission power 734. A user may use the two rotating dial controls 730, 734 to set the battery life and the wireless signal transmission power, respectively. The transmission power is dependent on the battery life, and hence, the permissible range of battery life depends on the setting of the transmission power. Similarly, the permissible range of the transmission power depends on the setting of the battery life. For example, the combination of maximum battery life and highest transmission power may not be selected.

Each of the rotating dial controls 730, 734 includes a knob with indicator 744 or 756. As the knob rotates, the indicators 744, 756 move along paths 748, 752 shaped as arcs. When the knob is turned to the most counter-clockwise direction, the battery life or the transmission power is the shortest. Conversely, the knob is turned to the most clockwise direction, the battery life or the transmission power is the longest. In one embodiment, the arcs of paths 748, 752 can be extended (become longer) or shortened in response to the setting of the other knob if the permissible range of one performance parameter (e.g., battery life) depends on the setting of the other parameter (e.g., transmission power).

The rotating dial controls 730, 734 are advantageous for similar reasons described above with reference to the slider in FIG. 7A. That is, the rotating dials give a visual cue that allows the user to perceive the setting of the performance parameters and/or the configuration parameters relative to other available settings. Further, the rotating controls 730, 734 also allow the user to conveniently observe changes in the configuration parameters as the performance parameters change.

In this example, four configuration parameters are provided: (i) the frequency (e.g., 2 hours) of data transmission when the asset tracking device 300 is stationary; (ii) the frequency (e.g., 10 minutes) of data transmission when the asset tracking device 300 is moving; (iii) the number of repeats of transmission messages when the asset tracking device 300 is stationary, and (iv) the number of repeats of transmission messages when the asset tracking device 300 is moving. Otherwise, messages 714B and 718B of FIG. 7B are essentially the same as messages 714A and 718A of FIG. 7A, and therefore, detailed description thereof is omitted herein for the sake of brevity. The operations associated with the "Ok" button 722 and the "Cancel" button 726 is the same as the example described above with reference to FIG. 7A.

Figure 7C:
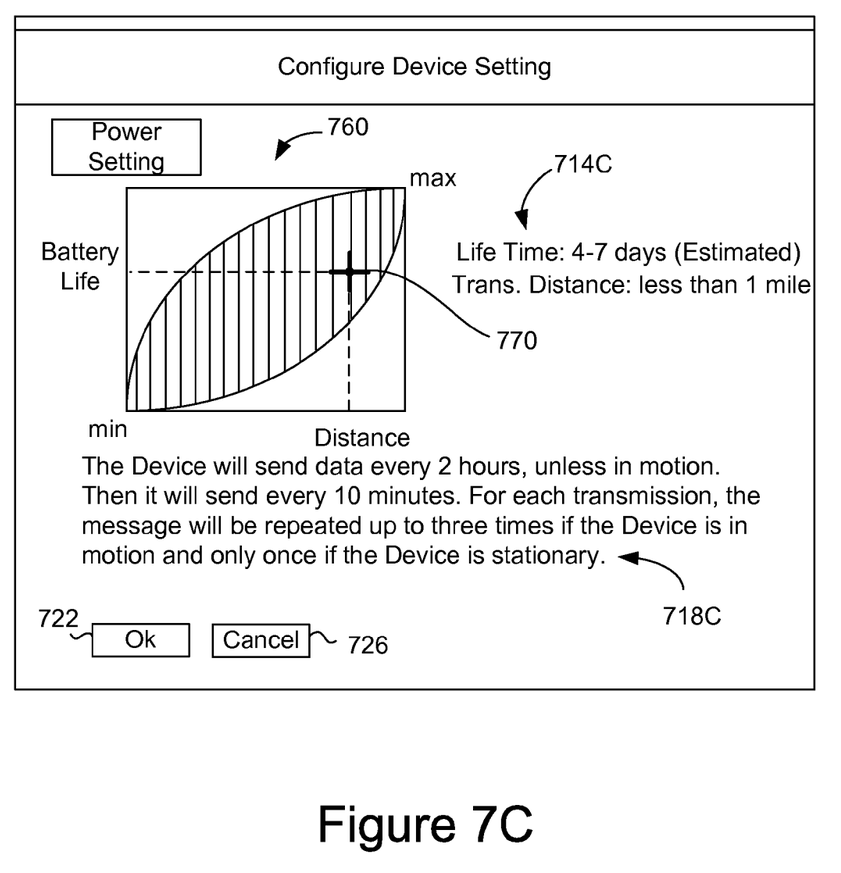
FIG. 7C is a user interface screen illustrating a two dimensional grid for setting two performance parameters, according to one embodiment of the present invention.

FIG. 7C is a user interface screen illustrating a two dimensional grid 760 for setting two performance parameters, according to one embodiment of the present invention. The vertical axis of the two dimensional grid 760 represents the battery life of the asset tracking device 300 while the horizontal axis of the two dimensional grid 760 represents the transmission distance of wireless signal. A user can move an indicator 770 (represented as "+" mark) in the hashed portion of the grid 760 to configure the two performance parameters (i.e., the battery life and the transmission distance").

The operations associated with the "Ok" button 722, the "Cancel" button 726, messages 714C and 718C of FIG. 7C are essentially the same as messages 714B and 718B in FIG. 7B. Hence, description about these user interface elements is omitted herein for the sake of brevity.

The user interface elements such as a slider control, rotating dial controls and a two dimensional grid as described above with reference to FIGS. 7A through 7C are merely illustrative. Various other user interface elements may be employed to set the performance parameters, and thereby set the configuration parameters. Moreover, more than two performance parameters may be set by a user. Moreover, the configuration parameters may be displayed in other formats such as radio buttons (showing functions turned on/off), graphs or other graphical user interface elements.

In one embodiment, a user device may communicate with multiple asset tracking devices and set the configuration parameters according to the performance parameter received from the user. The user may propagate the same configuration parameters for multiple setting in a configuration session. In this way, a user can conveniently set the multiple asset tracking devices in a single configuration session without setting individual asset tracking devices.

In one embodiment, the mapper table or functions is not generated in advance. Rather, the mapper table or functions are created on demand when an action is taken by the user to configure the asset tracking device. The optimizer may analyse the current state of the asset tracking device and generate mapper table according to the current state of the asset tracking device.

Although embodiments are described above with reference to asset tracking devices, other types of devices may also be also configured by using the principles described herein. For example, computing devices, network equipments, process plants, automobiles and other industrial equipments may be configured using the configuration scheme described herein.

What is claimed is:

1. A method of configuring an asset tracking device, comprising:
   displaying at least two user interface elements, each user interface element having an indicator movable in two different directions;
   receiving user input to move a first indicator of a first user interface element of the at least two user interface elements in a first direction or a second direction, moving the first indicator in the first direction representing increase of a first performance parameter of the asset tracking device and moving the first indicator in the second direction indicating decrease of the first performance parameter of the asset tracking device;
   receiving user input to move a second indicator of a second user interface element of the at least two user interface elements in a first direction or a second direction, moving the second indicator in the first direction representing increase of a second performance parameter of the asset tracking device and moving the second indicator in the second direction indicating decrease of the second performance parameter of the asset tracking device;
   generating and storing a mapper table by:
     (i) defining sets of configuration parameters of the asset tracking device wherein the sets of configuration parameters comprise at least two of (a) frequency of message transmittal by the asset tracking device, (b) processing speed of a processor in the asset tracking device, (c) light intensity of a display device of the asset tracking device, (d) strength of transmission signal, (e) enabling or disabling of functions of the asset tracking device, and (f) configuration of global positioning system receivers of the asset tracking device,
     (ii) computing a performance parameter value for each set of configuration parameters,
     (iii) selectively discarding one or more sets of configuration parameters that each map to a particular performance parameter value, and thereby prevent the discarded sets of configuration parameters from being stored in the mapper table, and
     (iv) storing remaining performance parameters and associated sets of configuration parameters on a computer readable storage device;
   determining, using the mapper table, configuration parameters corresponding to the performance parameters set by moving the indicators, wherein there are more configuration parameters than interface elements;
   configuring the asset tracking device according to the determined configuration parameters.

2. The method of claim 1, further comprising:
   displaying at least one of the performance parameters corresponding to the movement of at least one of the indicators; and
   displaying the configuration parameters corresponding to the set performance parameter.

3. The method of claim 1, wherein the asset tracking device comprises at least one sensor for sending location or state of an asset associated with the asset tracking device.

4. The method of claim 1, wherein the user interface element comprises a control mechanism comprising a continuous path extending between two end points, wherein the indicator is movable along the path between the two end points, a lower one of the two end points corresponds to a lower extreme of a value range of the performance parameter, an upper one of the two end point corresponds to an upper extreme of the value range of the performance parameter.

5. The method of claim 4, wherein the control mechanism comprises a slider control or a rotatable dial control.

6. The method of claim 1, wherein determining the sets of configuration parameters comprises identifying a set of configuration parameters corresponding to the performance parameter from the mapper table.

7. A computer system for presenting configuration options to a user, comprising:
   a display screen configured to display at least two user interface elements, each user interface element having an indicator movable in two different directions;
   an input module selected from the group consisting of a keypad, a touchscreen, and a tracking device, the input module being configured to receive user input to move:
     a first of the indicators in a first direction or a second direction, moving the first indicator in the first direction representing increase of a first performance parameter of an asset tracking device and moving the first indicator in the second direction indicating decrease of the first performance parameter of the asset tracking device;
     a second of the indicators in a first direction or a second direction, moving the second indicator in the first direction representing increase of a second performance parameter of the asset tracking device and moving the second indicator in the second direction indicating decrease of the second performance parameter of the asset tracking device;
   a computer readable storage device having stored thereon a mapper table generated by:
     (i) defining sets of configuration parameters of the asset tracking device wherein the sets of configuration parameters comprise at least two of (a) frequency of message transmittal by the asset tracking device, (b) processing speed of a processor in the asset tracking device, (c) light intensity of a display device of the asset tracking device, (d) strength of transmission signal, (e) enabling or disabling of functions of the asset tracking device, and (f) configuration of global positioning system receivers of the asset tracking device,
     (ii) computing a performance parameter value for each set of configuration parameters,
     (iii) selectively discarding one or more sets of configuration parameters that each map to a particular performance parameter value, and thereby prevent the discarded sets of configuration parameters from being stored in the mapper table, and
     (iv) storing remaining performance parameters and associated sets of configuration parameters; and a processor configured to:
    determine, using the mapper table, configuration parameters corresponding to the performance parameters set by moving the indicators, wherein there are more configuration parameters than interface elements; and
    configure the asset tracking device according to the determined configuration parameters.

8. The computer system of claim 7, wherein the display screen is further configured to:
    display the performance parameter corresponding to movement of the indicator; and
    display the configuration parameters corresponding to the set performance parameter.

9. The computer system of claim 7, wherein the user interface element comprises a control mechanism comprising a continuous path extending between two end points, wherein the indicator is movable along the path between the two end points, a lower one of the two end points corresponds to a lower extreme of a value range of the performance parameter, an upper one of the two end point corresponds to an upper extreme of the value range of the performance parameter.

10. The computer system of claim 9, wherein the control mechanism comprises a slider control or a rotatable dial control.

11. The computer system of claim 7, wherein the processor is configured to determine the sets of configuration parameters by identifying a set of configuration parameters corresponding to the performance parameter from the mapper table.

12. A non-transitory computer readable storage medium structured to store instructions executable by a processor in a computing device, the instructions, when executed causing the processor to:
    generate and store a mapper table by:
        (i) defining sets of configuration parameters of the asset tracking device wherein the sets of configuration parameters comprise at least two of (a) frequency of message transmittal by the asset tracking device, (b) processing speed of a processor in the asset tracking device, (c) light intensity of a display device of the asset tracking device, (d) strength of transmission signal, (e) enabling or disabling of functions of the asset tracking device, and (f) configuration of global positioning system receivers of the asset tracking device,
        (ii) computing a performance parameter value for each set of configuration parameters,
        (iii) selectively discarding one or more sets of configuration parameters that each map to a particular performance parameter value, and thereby prevent the discarded sets of configuration parameters from being stored in the mapper table, and
        (iv) storing remaining performance parameters and associated sets of configuration parameters on a computer readable storage device;
    display at least two user interface elements, each user interface element having an indicator movable in two different directions;
    receive user input to move:
        a first of the indicators in a first direction or a second direction, moving the first indicator in the first direction representing increase of a first performance parameter of an asset tracking device and moving the first indicator in the second direction indicating decrease of the first performance parameter of the asset tracking device; and
        a second of the indicators in a first direction or a second direction, moving the second indicator in the first direction representing increase of a second performance parameter of the asset tracking device and moving the second indicator in the second direction indicating decrease of the second performance parameter of the asset tracking device;
    determine, using the mapper table, configuration parameters corresponding to the performance-parameters set by moving the indicators, wherein there are more configuration parameters than interface elements; and
    configure the asset tracking device according to the determined configuration parameters.

13. The computer readable storage medium of claim 12, further comprising instructions to:
    display the performance parameter corresponding to movement of the indicator; and
    display the configuration parameters corresponding to the set performance parameter.

14. The computer readable storage medium of claim 12, wherein the user interface element comprises a control mechanism comprising a continuous path extending between two end points, wherein the indicator movable along the path between the two end points, a lower one of the two end points corresponds to a lower extreme of a value range of the performance parameter, an upper one of the two end point corresponds to an upper extreme of the value range of the performance parameter.

15. The computer readable storage medium of claim 14, wherein the control mechanism comprises a slider control or a rotatable dial control.

16. The method of claim 1, wherein the performance parameter comprises at least one of a battery life of the asset tracking device, used memory space, responsiveness of the asset tracking device, extent of sensor signal processing, and accuracy of location determination.

* * * * *